United States Patent
Cheng et al.

(10) Patent No.: US 11,552,727 B2
(45) Date of Patent: Jan. 10, 2023

(54) APPARATUSES AND METHODS FOR FAST SWITCHING FROM TRIGGER MODE TO CONTENTION MODE UPLINK (UL) TRANSMISSION

(71) Applicant: MEDIATEK INC., Hsinchu (TW)

(72) Inventors: Wan-Jie Cheng, Hsinchu (TW); Kuo-Hsuan Lee, Hsinchu (TW); Ying-You Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/242,403

(22) Filed: Apr. 28, 2021

(65) Prior Publication Data

US 2021/0351864 A1 Nov. 11, 2021

Related U.S. Application Data

(60) Provisional application No. 63/020,581, filed on May 6, 2020.

(51) Int. Cl.
| | |
|---|---|
| *H04L 1/00* | (2006.01) |
| *H04L 1/16* | (2006.01) |
| *H04W 88/04* | (2009.01) |
| *H04W 88/12* | (2009.01) |
| *H04W 84/12* | (2009.01) |

(52) U.S. Cl.
CPC .......... *H04L 1/0025* (2013.01); *H04L 1/1621* (2013.01); *H04W 88/04* (2013.01); *H04W 88/12* (2013.01); *H04W 84/12* (2013.01)

(58) Field of Classification Search
CPC ..... H04W 88/04; H04W 88/12; H04W 84/12; H04W 28/18; H04W 74/0816; H04W 72/121; H04W 28/0268; H04W 52/0216; H04L 1/0025; H04L 1/1621; H04L 1/1614; H04B 7/0452

See application file for complete search history.

(56) References Cited

U.S. PATENT DOCUMENTS

| | | | |
|---|---|---|---|
| 2018/0167882 A1* | 6/2018 | Choi | H04W 52/0216 |
| 2019/0273553 A1 | 9/2019 | Li et al. | |
| 2019/0357256 A1 | 11/2019 | Kim et al. | |
| 2020/0029350 A1* | 1/2020 | Asterjadhi | H04W 28/18 |
| 2020/0037342 A1 | 1/2020 | Seok et al. | |
| 2020/0053729 A1 | 2/2020 | Borges et al. | |
| 2021/0045120 A1* | 2/2021 | Gidvani | H04W 72/1257 |

OTHER PUBLICATIONS

Chinese language office action dated Jan. 17, 2022, issued in application No. TW 110115999.

* cited by examiner

*Primary Examiner* — Quoc Thai N Vu
(74) *Attorney, Agent, or Firm* — McClure, Qualey & Rodack, LLP

(57) ABSTRACT

A wireless communication terminal including a wireless transceiver and a controller is provided. The wireless transceiver performs wireless transmission and reception to and from an Access Point (AP). The controller is coupled to the wireless transceiver, and configures the wireless communication terminal to operate as a Station (STA) to associate with the AP in compliance with an Institute of Electrical and Electronics Engineers (IEEE) 802.11 standard. Also, the controller receives a beacon frame indicating to disable an UL MU operation from the AP via the wireless transceiver, and enables the STA to operate in a contention mode for UL transmission in response to receiving the beacon frame indicating to disable the UL MU operation.

16 Claims, 6 Drawing Sheets

APPARATUSES AND METHODS FOR FAST SWITCHING FROM TRIGGER MODE TO CONTENTION MODE UPLINK (UL) TRANSMISSION

CROSS REFERENCE TO RELATED APPLICATIONS

This application claims priority of U.S. Provisional Application No. 63/020,581, filed on May 6, 2020, the entirety of which is incorporated by reference herein.

BACKGROUND OF THE APPLICATION

Field of the Application

The application generally relates to wireless communications, and more particularly, to apparatuses and methods for fast switching from trigger mode to contention mode Uplink (UL) transmission.

Description of the Related Art

With growing demand for ubiquitous computing and networking, various wireless technologies have been developed, including Wireless-Fidelity (Wi-Fi) which is a Wireless Local Area Network (WLAN) technology allowing mobile devices, such as a smartphone, a smart pad, a laptop computer, a portable multimedia player, an embedded apparatus, or the like, to obtain wireless services in a frequency band of 2.4 GHz, 5 GHz, 6 GHz, or 60 GHz.

The Institute of Electrical and Electronics Engineers (IEEE) has commercialized or developed various technological standards since an initial WLAN technology is supported using frequencies of 2.4 GHz. For example, IEEE 802.11ac supports Multi-User (MU) transmission using spatial degrees of freedom via an MU-Multiple Input-Multiple-Output (MU-MIMO) scheme in a downlink (DL) direction from an Access Point (AP) to Stations (STAs). To improve the performance experienced by users of the aforementioned mobile devices, who demand high-capacity and high-rate services, IEEE 802.11ax has been proposed, which uses both Orthogonal Frequency Division Multiple Access (OFDMA) and/or MU-MIMO in both DL and uplink (UL) directions. That is, in addition to supporting frequency and spatial multiplexing from an AP to multiple STAs, transmissions from multiple STAs to the AP are also supported in IEEE 802.11ax.

In IEEE 802.11ax, MU Enhanced Distributed Channel Access (EDCA) has been introduced to temporarily deprioritize medium access for STAs participating in uplink OFDMA operation. For trigger-based UL MU transmission, an AP may send a trigger frame to request a group of STAs to participate in an UL MU operation. A trigger frame may contain information including the list of STAs involved in the UL MU operation, and user-specific information (e.g., Resource Unit (RU) and spatial stream allocation, modulation and coding scheme, etc.). The STAs participating in the UL MU operation may perform UL transmission in the assigned resources after receiving the trigger frame. Upon completion of the UL transmission initiated by the trigger frame, the STA needs to start an MU EDCA timer and stay silent (i.e., forbidden to perform any UL transmission) until the next trigger frame is received. In a worse case, an STA may not receive any trigger frame before the MU EDCA timer expires. That is, the STA may need to wait for the expiry of the MU EDCA timer, so that it can switch from the trigger mode to the contention mode for UL Single-User (SU) transmission (also called contention mode UL transmission). However, the countdown of the MU EDCA timer may be up to 2 seconds long, which will inevitably cause a noticeable performance drop in the STA.

A solution is sought.

BRIEF SUMMARY OF THE APPLICATION

In order to solve the aforementioned problem, the present application proposes to allow the STA to fast switch from trigger mode to contention mode UL transmission, by using the beacon frame to indicate to the STA to disable the UL MU operation. As the beacon frame is generally sent in a constant periodicity (e.g., once every 20 milliseconds), the user of the STA may not experience a performance drop during the mode switching for UL transmission. Advantageously, user experience and system throughput may be improved.

In a first aspect of the application, a wireless communication terminal comprising a wireless transceiver and a controller is provided. The wireless transceiver is configured to perform wireless transmission and reception to and from an AP. The controller is coupled to the wireless transceiver, and operable to configure the wireless communication terminal to operate as an STA to associate with the AP in compliance with an IEEE 802.11 standard, receive a beacon frame indicating to disable an UL MU operation from the AP via the wireless transceiver, and enable the STA to operate in a contention mode for UL transmission in response to receiving the beacon frame indicating to disable the UL MU operation.

In a first implementation form of the first aspect of the application, the AP is a High Efficiency (HE) AP and the STA is a non-AP HE STA in response to the IEEE 802.11 standard being an IEEE 802.11ax standard.

In a second implementation form of the first aspect of the application, the beacon frame comprises an MU EDCA timer field which is set to 0 for indicating to disable the UL MU operation.

In a third implementation form of the first aspect of the application in combination with the second implementation form of the first aspect of the application, the controller is further operable to reset an MU EDCA timer and disable the UL MU operation in response to the MU EDCA timer field of the beacon frame being set to 0.

In a fourth implementation form of the first aspect of the application, the UL MU operation comprises the following: receiving a trigger frame indicating a Resource Unit (RU) for the STA from the AP via the wireless transceiver; using the RU to send an MU Physical layer Protocol Data Unit (PPDU) to the AP via the wireless transceiver in response to receiving the trigger frame; receiving, from the AP via the wireless transceiver, a Block Acknowledgement (BA) for acknowledging reception of the MU PPDU by the AP; starting an MU EDCA timer in response to receiving the BA; and refraining the STA from UL transmission when the MU EDCA timer is running.

In a second aspect of the application, a method executed by a wireless communication terminal is provided. The method comprises the following steps: operating as an STA to associate with an AP in compliance with an IEEE 802.11 standard; receiving, from the AP, a beacon frame indicating to disable an UL MU operation with the AP; and enabling the STA to operate in a contention mode for UL transmission in response to receiving the beacon frame indicating to disable the UL MU operation.

In a first implementation form of the second aspect of the application, the AP is an HEAP and the STA is a non-AP HE STA in response to the IEEE 802.11 standard being an IEEE 802.11ax standard.

In a second implementation form of the second aspect of the application, the beacon frame comprises an MU EDCA timer field which is set to 0 for indicating to disable the UL MU operation.

In a third implementation form of the second aspect of the application in combination with the second implementation form of the second aspect of the application, the method further comprises: resetting an MU EDCA timer and disabling the UL MU operation in response to the MU EDCA timer field of the beacon frame being set to 0.

In a fourth implementation form of the second aspect of the application, the UL MU operation comprises the following: receiving a trigger frame indicating an RU for the STA from the AP; using the RU to send an MU PPDU to the AP in response to receiving the trigger frame; receiving, from the AP, a BA for acknowledging reception of the MU PPDU by the AP; starting an MU EDCA timer in response to receiving the BA; and refraining the STA from UL transmission when the MU EDCA timer is running.

In a third aspect of the application, a wireless communication device comprising a wireless transceiver and a controller is provided. The wireless transceiver is configured to perform wireless transmission and reception to and from an STA. The controller is coupled to the wireless transceiver, and is operable to: configure the wireless communication device to operate as an AP to serve the STA in compliance with an IEEE 802.11 standard, and send a beacon frame for the STA to disable an UL MU operation via the wireless transceiver.

In a first implementation form of the third aspect of the application, the AP is an HE AP and the STA is a non-AP HE STA in response to the IEEE 802.11 standard being an IEEE 802.11ax standard.

In a second implementation form of the third aspect of the application, the beacon frame comprises an MU EDCA timer field which is set to 0 for indicating to disable the UL MU operation.

In a third implementation form of the third aspect of the application, the controller is further operable to determine a traffic type associated with the STA, and the beacon frame is sent in response to the traffic type requiring a throughput greater than a predetermined threshold.

In a fourth implementation form of the third aspect of the application, the controller is further operable to send another beacon frame comprising an MU EDCA timer field which is set to a non-zero value and send a trigger frame to another STA via the wireless transceiver after sending the beacon frame, wherein a traffic type of the other STA requires a throughput lower than a predetermined threshold.

In a fourth aspect of the application, a method executed by a wireless communication device is provided. The method comprises the following steps: operating as an AP to serve an STA in compliance with IEEE 802.11 standards; and sending a beacon frame for the STA to disable an UL MU operation.

In a first implementation form of the fourth aspect of the application, the AP is an HEAP and the STA is a non-AP HE STA in response to the IEEE 802.11 standard being an IEEE 802.11ax standard.

In a second implementation form of the fourth aspect of the application, the beacon frame comprises an MU EDCA timer field which is set to 0 for indicating to disable the UL MU operation.

In a third implementation form of the fourth aspect of the application, the method further comprises: determining a traffic type associated with the STA; wherein the beacon frame is sent in response to the traffic type requiring a throughput greater than a predetermined threshold.

In a fourth implementation form of the fourth aspect of the application, the method further comprises: sending another beacon frame comprising an MU EDCA timer field which is set to a non-zero value and sending a trigger frame to another STA after sending the beacon frame; wherein a traffic type of the other STA requires a throughput lower than a predetermined threshold.

Other aspects and features of the present application will become apparent to those with ordinary skill in the art upon review of the following descriptions of specific embodiments of the apparatuses and methods for fast switching from trigger mode to contention mode transmission.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
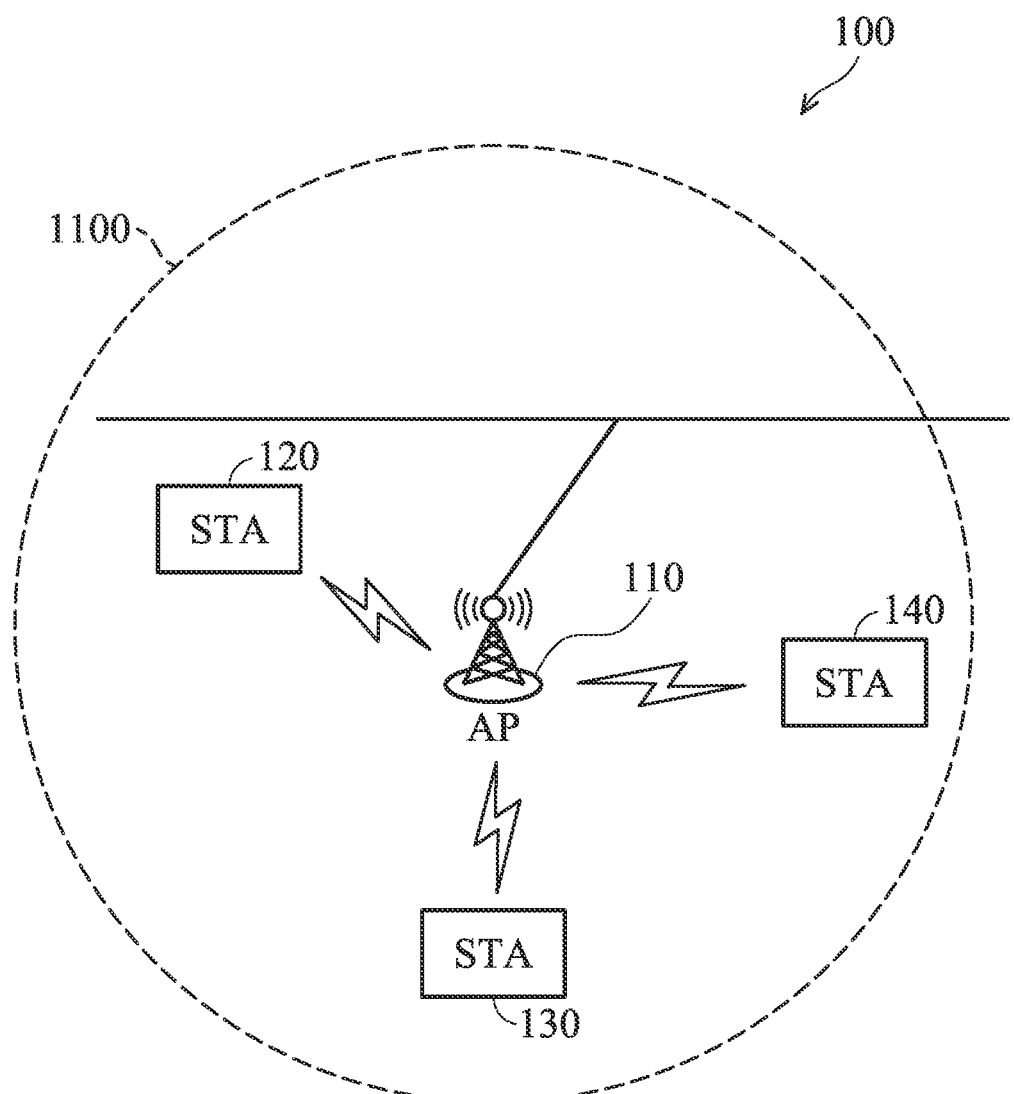
FIG. 1 is a block diagram of a wireless communication system according to an embodiment of the application.

FIG. 1 is a block diagram of a wireless communication system according to an embodiment of the application.

As shown in FIG. 1, the wireless communication system 100 includes an Access Point (AP) 110 and a plurality of stations (STAs) 120~140. The AP 110 is an entity compatible with an IEEE 802.11 standard to provide and manage the access to the wireless medium for the STAs 120~140. The AP 110 has a coverage area 1100 such that STAs 120~140 within that area are within range of the AP 110. The STAs 120~140 are dispersed throughout the coverage area 1100. Each of the STAs 120~140 may be stationary, mobile, or a combination thereof.

In one embodiment, the AP 110 may be a High Efficiency (HE) AP or an HE STA operating in the AP mode, which is compatible with the IEEE 802.11ax standard.

In another embodiment, the AP 110 may be an AP which is compatible with any IEEE 802.11 standard later than 802.11ax.

Each of the STAs 120~140 may be a mobile phone (e.g., feature phone or smartphone), an wearable electronic (e.g., smart watch or smart glass), a panel Personal Computer (PC), a laptop computer, or any wireless communication terminal, as long as it is compatible with the same IEEE 802.11 standard as the AP 110. Each of the STAs 120~140 may operate in the non-AP mode to associate and communicate with the AP 110 for Uplink (UL) and/or Downlink (DL) transmissions.

At a given point in time, the STAs 120~140 may be configured to participate in an UL MU operation. That is, the STAs 120~140 may perform UL transmissions based on the trigger frame received from the AP 110 (also called trigger mode UL transmission). The trigger frame may contain information including the list of STAs involved in the UL MU operation, and user-specific information (e.g., Resource Unit (RU) and spatial stream allocation, modulation and coding scheme, etc.). However, according to the current IEEE 802.11ax standard, an STA participating in an UL MU operation is allowed to switch from the trigger mode to the contention mode for UL transmissions if it has not received any trigger frame before the MU EDCA timer expires. That is, the STA is forbidden to perform any UL transmission when the MU EDCA timer is running and just has to wait for the MU EDCA timer to expire.

In accordance with one novel aspect of the present application, the AP 110 is capable of using the beacon frame to indicate to the STAs 120~140 to disable the UL MU operation. Specifically, the AP 110 may set the MU EDCA timer field of the beacon frame to 0 for indicating to disable the UL MU operation. It should be noted that the AP 110 may sent another beacon frame before initiating the UL MU operation with the STAs 120~140, and the MU EDCA timer field of this previously sent beacon frame should be set to a non-zero value for enabling the STAs 120~140 to apply the use of the MU EDCA timer during the UL MU operation. That is, the AP 110 is allowed to promptly disable the UL MU operation at the STAs 120~140, by changing the MU EDCA timer value and providing the new MU EDCA timer value to the STAs 120~140 via a beacon frame. In response, the STAs 120~140 is allowed to fast switch from the trigger mode to the contention mode for UL transmission when receiving a beacon frame including an MU EDCA timer field that is set to 0.

Figure 2:
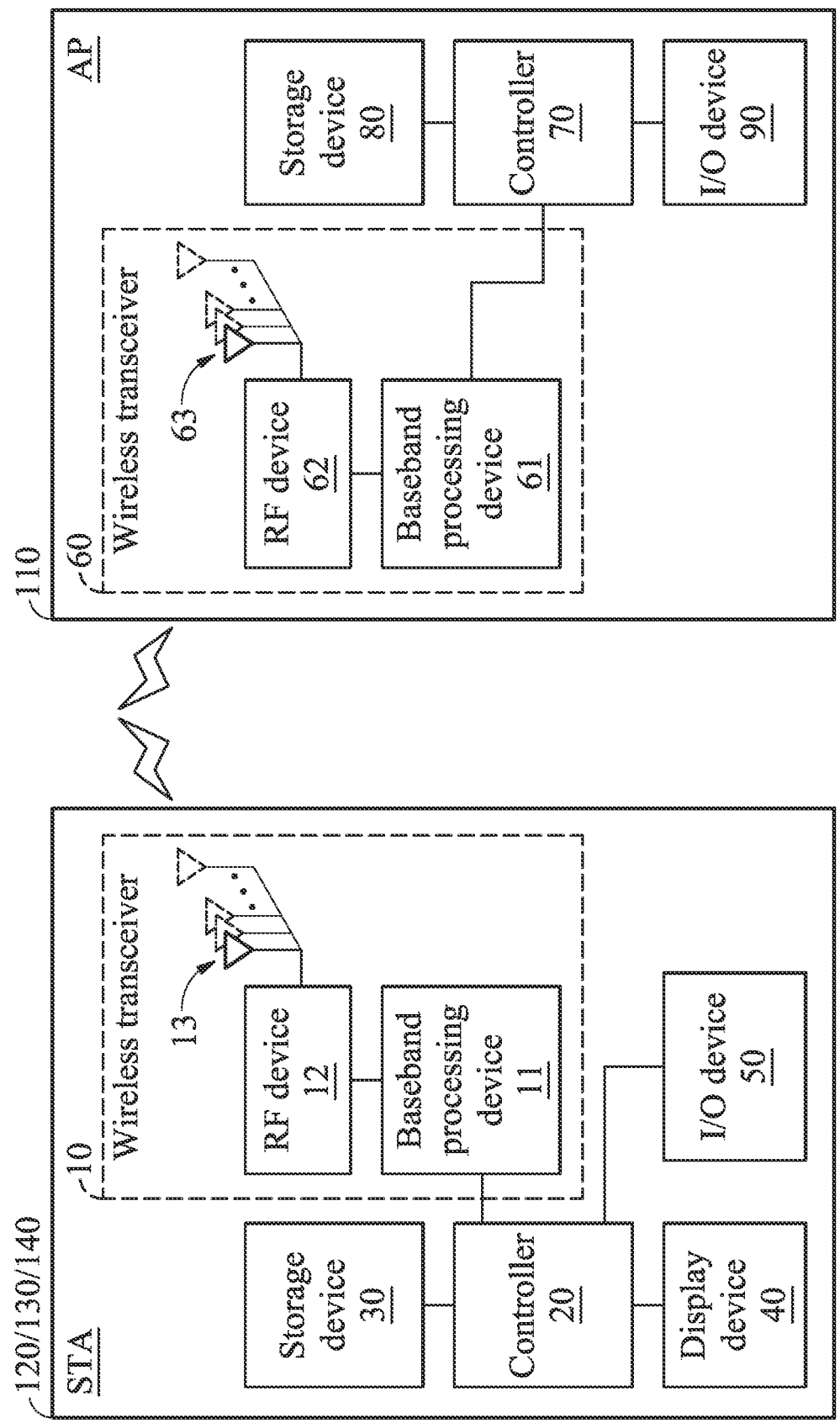
FIG. 2 is a block diagram illustrating the STA 120/130/140 and the AP 110 according to an embodiment of the application.

FIG. 2 is a block diagram illustrating the STA 120/130/140 and the AP 110 according to an embodiment of the application.

As shown in FIG. 2, the STA 120/130/140 may include a wireless transceiver 10, a controller 20, a storage device 30, a display device 40, and an Input/Output (I/O) device 50.

The wireless transceiver 10 is configured to perform wireless transmission and reception to and from the AP 110 or an AP mode STA. For example, the wireless transceiver 10 may be a Wi-Fi chip.

Specifically, the wireless transceiver 10 may include a baseband processing device 11, a Radio Frequency (RF) device 12, and antenna 13, wherein the antenna 13 may include an antenna array for UL/DL Multi-User Multiple Input-Multiple-Output (MU-MIMO).

The baseband processing device 11 is configured to perform baseband signal processing, such as Analog-to-Digital Conversion (ADC)/Digital-to-Analog Conversion (DAC), gain adjusting, modulation/demodulation, encoding/decoding, and so on. The baseband processing device 11 may contain multiple hardware components, such as a baseband processor, to perform the baseband signal processing.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the AP 110, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, the Wi-Fi protocol (of the IEEE 802.11be or another protocol version), and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

Similarly, the AP 110 may include a wireless transceiver 60, a controller 70, a storage device 80, and an I/O device 90.

The wireless transceiver 60 is configured to perform wireless transmission and reception to and from the STAs 120~140. For example, the wireless transceiver 60 may be a Wi-Fi chip.

Specifically, the wireless transceiver 60 may include a baseband processing device 61, an RF device 62, and antenna 63, wherein the antenna 63 may include an antenna array for UL/DL MU-MIMO.

The baseband processing device 61 is configured to perform baseband signal processing, such as ADC/DAC, gain adjusting, modulation/demodulation, encoding/decoding, and so on. The baseband processing device 61 may contain multiple hardware components, such as a baseband processor, to perform the baseband signal processing.

The RF device 62 may receive RF wireless signals via the antenna 63, convert the received RF wireless signals to baseband signals, which are processed by the baseband processing device 61, or receive baseband signals from the baseband processing device 61 and convert the received baseband signals to RF wireless signals, which are later transmitted via the antenna 63. The RF device 62 may also contain multiple hardware devices to perform radio frequency conversion. For example, the RF device 62 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The controller 70 may be a general-purpose processor, an MCU, an application processor, a DSP, or the like, which includes various circuits for providing the functions of data processing and computing, controlling the wireless transceiver 60 for wireless communications with the STAs 120~140, storing and retrieving data (e.g., program code) to and from the storage device 80, and receiving user inputs or outputting signals via the I/O device 90.

In particular, the controller 70 coordinates the aforementioned operations of the wireless transceiver 60, the storage device 80, and the I/O device 90 for performing the method of the present application.

In another embodiment, the controller 70 may be incorporated into the baseband processing device 61, to serve as a baseband processor.

As will be appreciated by persons skilled in the art, the circuits of the controllers 20 and 70 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, Wi-Fi protocol (of the IEEE 802.11be or another protocol version), and/or the method of the present application.

The I/O device 90 may include one or more buttons, a keyboard, a touch pad, a display device (e.g., LCD, LED, OLED, or EPD, etc.), a light emitting device, a microphone, and/or a speaker, etc., to serve as the MMI for interaction with users.

It should be understood that the components described in the embodiment of FIG. 2 are for illustrative purposes only and are not intended to limit the scope of the application. For example, the AP 110 or the STA 120/130/140 may include more components, such as another wireless transceiver for providing telecommunication services, a Global Positioning System (GPS) device for use of some location-based services or applications, and/or a battery for powering the other components, etc. Alternatively, the AP 110 or the STA 120/130/140 may include fewer components. For example, the STA 120/130/140 may not include the display device 40 and/or the I/O device 50.

Figure 3:
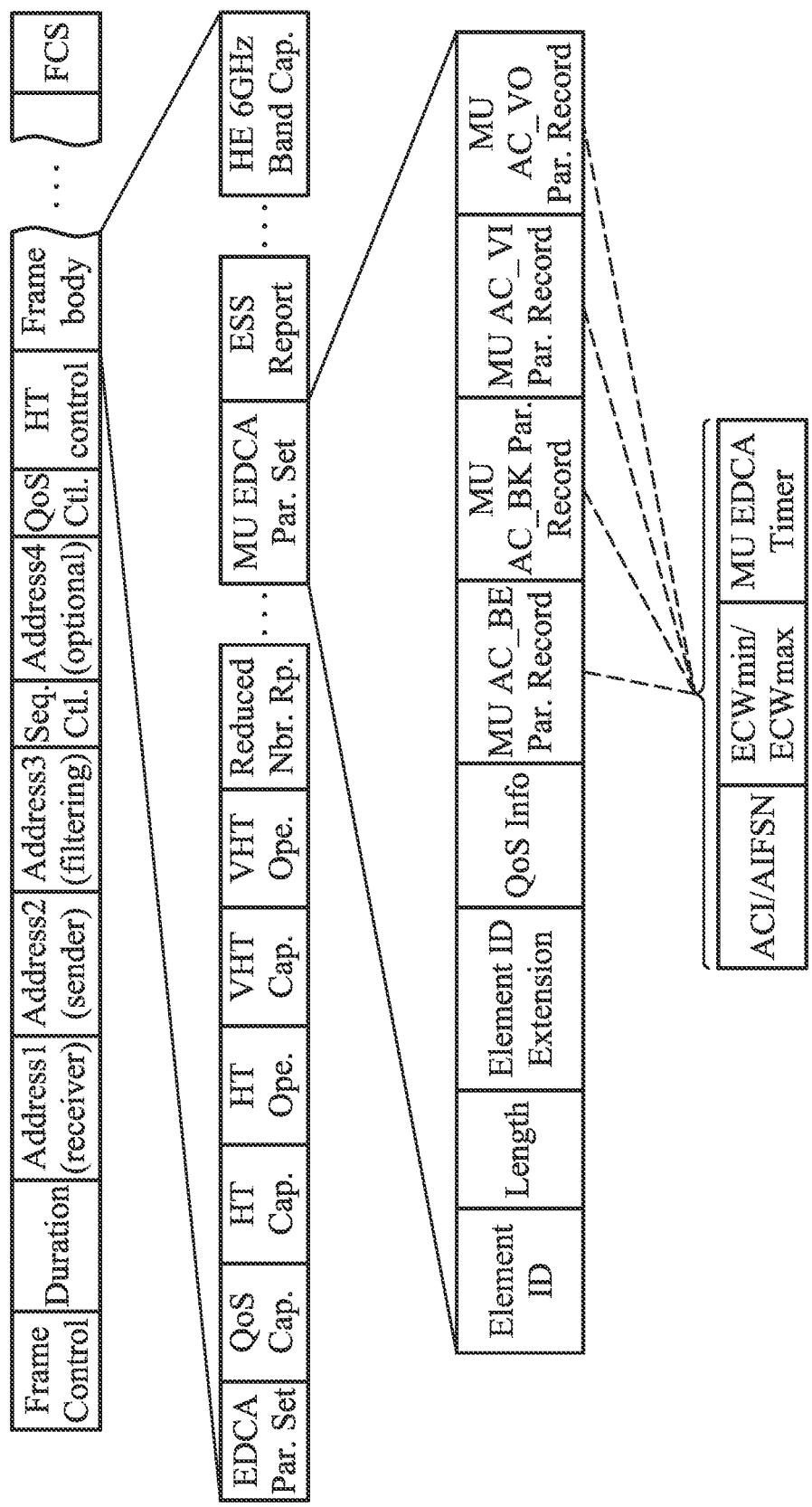
FIG. 3 is a schematic diagram illustrating the format of a beacon frame according to an embodiment of the application.

FIG. 3 is a schematic diagram illustrating the format of a beacon frame according to an embodiment of the application.

As shown in FIG. 3, the frame body of the beacon frame may contain various elements, such as the MU EDCA Parameter Set element which is used by an AP to control the EDCA operation from non-AP HE STAs. The most recent MU EDCA Parameter Set element received by a non-AP HE STA is used to update the appropriate MAC Information Base (MIB) values.

Specifically, the MU EDCA Parameter Set element contains multiple MU AC Parameter Record fields for different Access Categories (ACs), including voice (AC_VO), video (AC_VI), best effort (AC_BE), and background (AC_BK). The format of the MU AC_BE, MU AC_BK, MU AC_VI, and MU AC_VO Parameter Record fields are identical, and each includes an ACI/AIFSN field, an ECWmin/ECWmax field, and an MU EDCA Timer field. The MU EDCA Timer field indicates the duration of time, in units of 8 Time Units (TUs), and during which the HE STA uses the MU EDCA parameters for the corresponding AC.

Please note that, in the conventional practices, the MU EDCA Timer field is generally set to a non-zero value and the value 0 is reserved. By contrast, in the present application, an AP may set the MU EDCA Timer field to 0 to indicate to HE STAs to disable the UL MU operation.

Figure 4:
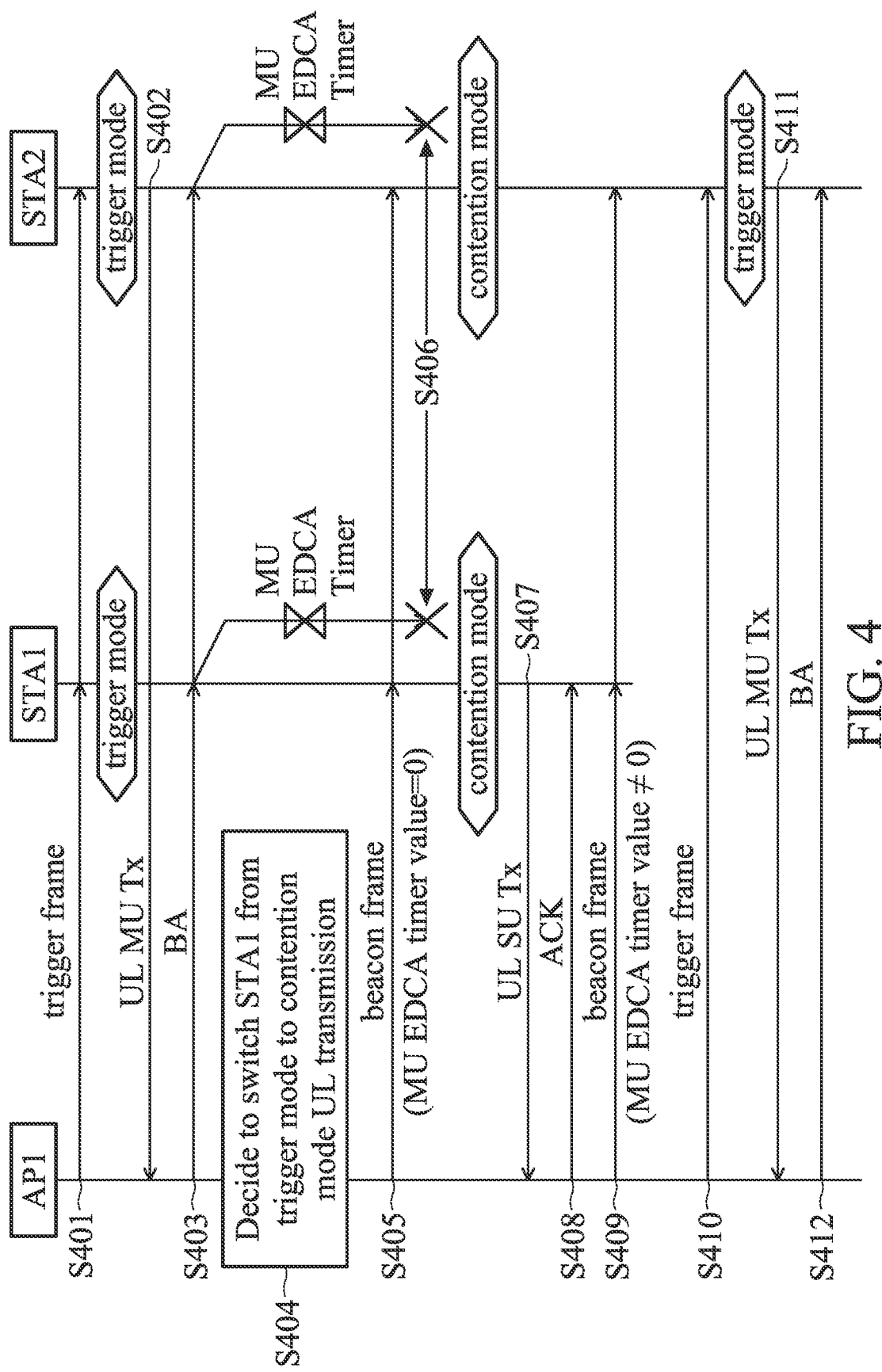
FIG. 4 is a message sequence chart illustrating the fast switching from trigger mode to contention mode UL transmission according to an embodiment of the application.

FIG. 4 is a message sequence chart illustrating the fast switching from trigger mode to contention mode UL transmission according to an embodiment of the application.

In this embodiment, STA1 and STA2 are participating in an UL MU operation with AP1 in the first place.

In step S401, AP1 sends a trigger frame to STA1 and STA2. As shown, both STA1 and STA2 enters trigger mode.

In step S402, STA1 and STA2 perform an UL MU transmission to AP1 in response to receiving the trigger frame. Specifically, the UL MU transmission may include sending an MU Physical layer Protocol Data Unit (PPDU) to AP1, wherein the MU PPDU includes different Resource Units (RUs) allocated for STA1 and STA2.

In step S403, AP1 sends a Block Acknowledgement (BA) to STA1 and STA2 for acknowledging the reception of the UL MU transmissions from STA1 and STA2, and both STA1 and STA2 starts the MU EDCA Timer (assumed to be previously assigned with a non-zero value).

In step S404, AP1 decides to switch STA1 from trigger mode to contention mode UL transmission.

In one embodiment, AP1 may periodically determine which one or more STAs participating in the UL MU operation should be switched from trigger mode to contention mode UL transmission, based on the traffic types of the STAs. For example, STA(s) with a traffic type that requires a high/peak throughput (e.g., File Transfer Protocol (FTP)

traffic) may be switched from trigger mode to contention mode UL transmission, while STA(s) with a small size and high-intensity traffic type (e.g., streaming or gaming traffic) may be preferred to stay in trigger mode.

In step S405, AP1 sends (e.g., broadcasts) a beacon frame including an MU EDCA Timer field that is set to 0 to STA1 and STA2.

In step S406, both STA1 and STA2 stop the MU EDCA Timer and switch from trigger mode to contention mode in response to receiving the beacon frame with an MU EDCA Timer field set to 0.

In step S407, STA1 performs UL SU transmission to AP1.

In step S408, AP1 sends an ACK to STA1 for acknowledging the reception of the UL SU transmission from STA1.

In step S409, AP1 sends (e.g., broadcasts) another beacon frame including an MU EDCA Timer field that is set to a non-zero value to STA1 and STA2.

In step S410, AP1 sends a trigger frame to STA2, causing STA2 to switch back to trigger mode.

In step S411, STA2 performs an UL MU transmission to AP1 in response to receiving the trigger frame.

In step S412, AP1 sends a BA to STA2 after receiving the UL MU transmission from STA2.

Figure 5:
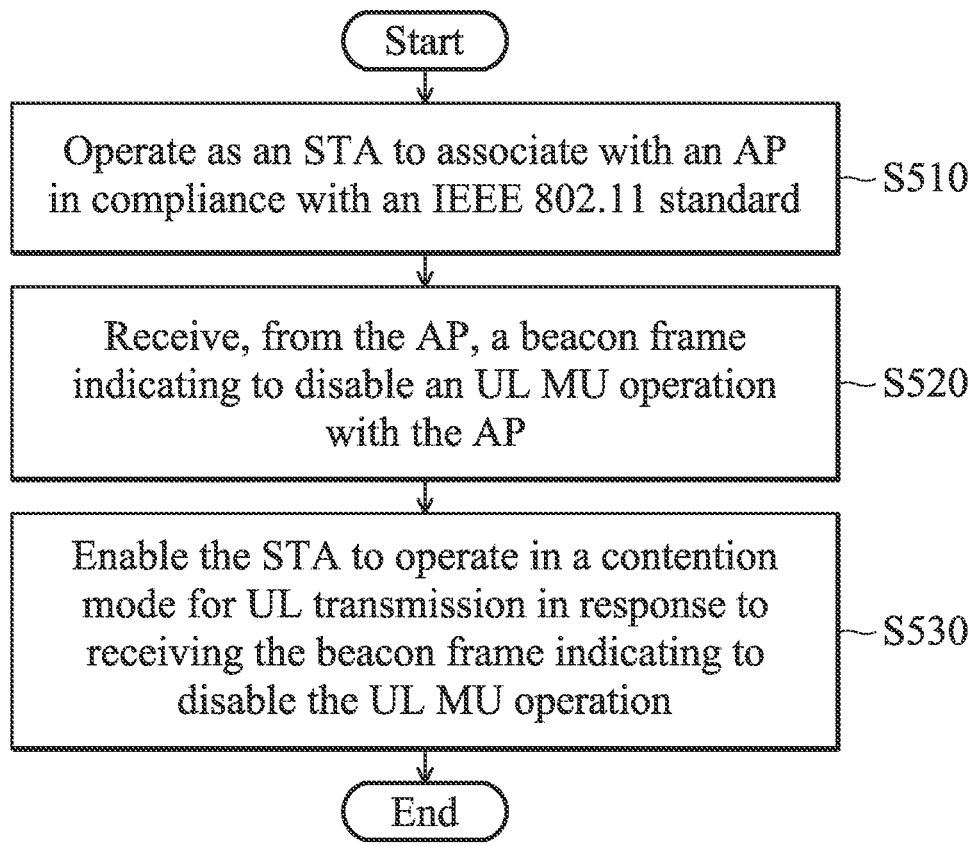
FIG. 5 is a flow chart illustrating the method for an STA to fast switch from trigger mode to contention mode UL transmission according to an embodiment of the application.

FIG. 5 is a flow chart illustrating the method for an STA to fast switch from trigger mode to contention mode UL transmission according to an embodiment of the application.

In this embodiment, the method is applied to and executed by a wireless communication terminal for fast switching from trigger mode to contention mode UL transmission.

To begin with, the wireless communication terminal operates as an STA to associate with an AP in compliance with an IEEE 802.11 standard (step S510).

In one embodiment, the AP is an HE AP and the STA is a non-AP HE STA in compliance with the IEEE 802.11ax standard.

Next, the wireless communication terminal receives, from the AP, a beacon frame indicating to disable an UL MU operation with the AP (step S520).

In one embodiment, the UL MU operation may include: receiving a trigger frame indicating an RU for the STA from the AP; using the RU to send an MU PPDU to the AP in response to receiving the trigger frame; receiving, from the AP, a BA for acknowledging reception of the MU PPDU by the AP; starting an MU EDCA timer in response to receiving the BA; and refraining the STA from UL transmission when the MU EDCA timer is running.

After that, the wireless communication terminal enables the STA to operate in a contention mode for UL transmission in response to receiving the beacon frame indicating to disable the UL MU operation (step S530).

In one embodiment, the beacon frame may include an MU EDCA timer field which is set to 0 for indicating to disable the UL MU operation, and the wireless communication terminal may reset the MU EDCA timer and disable the UL MU operation in response to the MU EDCA timer field of the beacon frame being set to 0.

Figure 6:
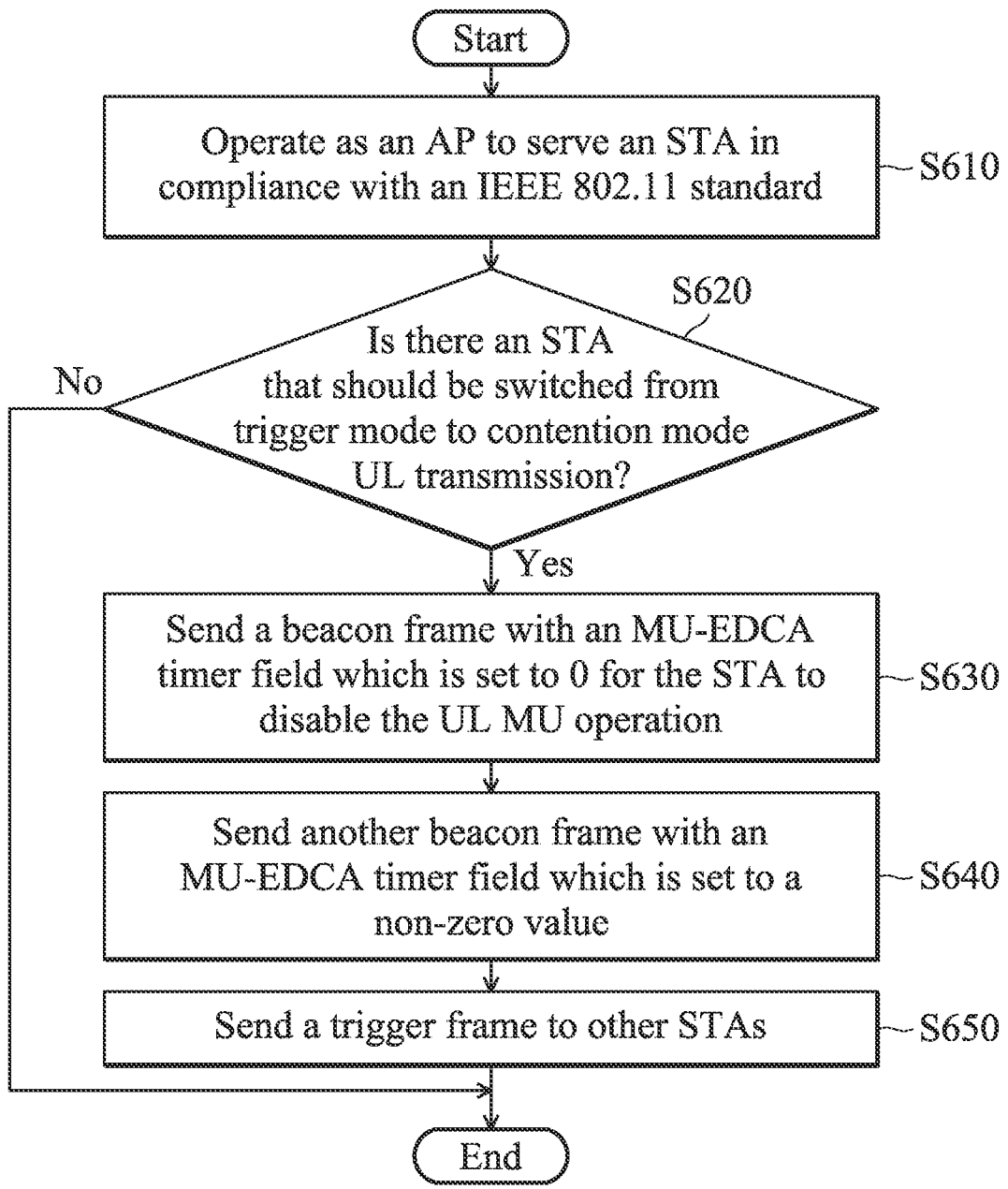
FIG. 6 is a flow chart illustrating the method for an AP to realize fast switching of an STA from trigger mode to contention mode UL transmission according to an embodiment of the application.

FIG. 6 is a flow chart illustrating the method for an AP to realize fast switching of an STA from trigger mode to contention mode UL transmission according to an embodiment of the application.

In this embodiment, the method is applied to and executed by a wireless communication device.

To begin with, the wireless communication device operates as an AP to serve an STA in compliance with an IEEE 802.11 standard (step S610).

In one embodiment, the AP is an HE AP and the STA is a non-AP HE STA in compliance with the IEEE 802.11ax standard.

Next, the wireless communication device determines whether one or more STAs should be switched to contention-based UL transmission (step S620).

In one embodiment, step S620 may be performed periodically based on the traffic types of the STAs. For example, STAs with a traffic type that requires a high/peak throughput (e.g., FTP traffic) may be switched from trigger mode to contention mode UL transmission, while STAs with a small size and high-intensity traffic type (e.g., streaming or gaming traffic) may be preferred to stay in trigger mode.

Subsequent to step S620, if there is one or more STAs that should be switched from trigger mode to contention mode UL transmission, the wireless communication device sends (e.g., broadcasts) a beacon frame with an MU-EDCA timer field which is set to 0 for the STA to disable the UL MU operation (step S630). Otherwise, if there is no STA that should be switched from trigger mode to contention mode UL transmission, the method ends.

Subsequent to step S630, the wireless communication device sends (e.g., broadcasts) another beacon frame with an MU-EDCA timer field which is set to a non-zero value (step S640).

Subsequent to step S640, the wireless communication device sends a trigger frame to other STAs (step S650), and the method ends.

In one embodiment, the other STAs may refer to the STAs with a small-sized and high-intensity traffic (e.g., streaming or gaming traffic), and these STAs may stay in the UL MU operation (i.e., trigger-based UL transmission) by the beacon frame with a non-zero MU-EDCA timer value and the trigger frame.

In view of the forgoing embodiments, it will be appreciated that the present application realizes fast switching of STAs from trigger mode to contention mode UL transmission, by using the beacon frame to indicate to the STAs to disable the UL MU operation. As the beacon frame is generally sent in a constant periodicity (e.g., once every 20 milliseconds), the users of the STAs may not experience a performance drop during the mode switching for UL transmission. Advantageously, user experience and system throughput may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A wireless communication terminal, comprising:
   a wireless transceiver, configured to perform wireless transmission and reception to and from an Access Point (AP); and
   a controller, coupled to the wireless transceiver, and operable to: configure the wireless communication terminal to operate as a Station (STA) to associate with the AP in compliance with an Institute of Electrical and Electronics Engineers (IEEE) 802.11 standard, receive a beacon frame indicating to disable an Uplink (UL) Multi-User (MU) operation from the AP via the wireless transceiver, and enable the STA to operate in a contention mode for UL transmission in response to receiving the beacon frame indicating to disable the UL MU operation, wherein the beacon frame comprises an MU Enhanced Distributed Channel Access (EDCA) timer field which is set to 0 for indicating to disable the UL MU operation.

2. The wireless communication terminal as claimed in claim 1, wherein the AP is a High Efficiency (HE) AP and the STA is a non-AP HE STA in response to the IEEE 802.11 standard being an IEEE 802.11ax standard.

3. The wireless communication terminal as claimed in claim 1, wherein the controller is further operable to reset an MU EDCA timer and disable the UL MU operation in response to the MU EDCA timer field of the beacon frame being set to 0.

4. The wireless communication terminal as claimed in claim 1, wherein the UL MU operation comprises the following:

receiving a trigger frame indicating a Resource Unit (RU) for the STA from the AP via the wireless transceiver;

using the RU to send an MU Physical layer Protocol Data Unit (PPDU) to the AP via the wireless transceiver in response to receiving the trigger frame;

receiving, from the AP via the wireless transceiver, a Block Acknowledgement (BA) for acknowledging reception of the MU PPDU by the AP;

starting an MU EDCA timer in response to receiving the BA; and refraining the STA from UL transmission when the MU EDCA timer is running.

5. A method, executed by a wireless communication terminal, the method comprising:

operating as an STA to associate with an AP in compliance with an IEEE 802.11 standard;

receiving, from the AP, a beacon frame indicating to disable an UL MU operation with the AP; and enabling the STA to operate in a contention mode for UL transmission in response to receiving the beacon frame indicating to disable the UL MU operation, wherein the beacon frame comprises an MU EDCA timer field which is set to 0 for indicating to disable the UL MU operation.

6. The method as claimed in claim 5, wherein the AP is an HE AP and the STA is a non-AP HE STA in response to the IEEE 802.11 standard being an IEEE 802.11ax standard.

7. The method as claimed in claim 5, further comprising:

resetting an MU EDCA timer and disabling the UL MU operation in response to the MU EDCA timer field of the beacon frame being set to 0.

8. The method as claimed in claim 5, wherein the UL MU operation comprises the following:

receiving a trigger frame indicating an RU for the STA from the AP;

using the RU to send an MU PPDU to the AP in response to receiving the trigger frame;

receiving, from the AP, a BA for acknowledging reception of the MU PPDU by the AP;

starting an MU EDCA timer in response to receiving the BA; and refraining the STA from UL transmission when the MU EDCA timer is running.

9. A wireless communication device, comprising:

a wireless transceiver, configured to perform wireless transmission and reception to and from an STA; and a controller, coupled to the wireless transceiver, and operable to: configure the wireless communication device to operate as an AP to serve the STA in compliance with an IEEE 802.11 standard, and send a beacon frame for the STA to disable an UL MU operation via the wireless transceiver, wherein the beacon frame comprises an MU EDCA timer field which is set to 0 for indicating to disable the UL MU operation.

10. The wireless communication device as claimed in claim 9, wherein the AP is an HE AP and the STA is a non-AP HE STA in response to the IEEE 802.11 standard being an IEEE 802.11ax standard.

11. The wireless communication device as claimed in claim 9, wherein the controller is further operable to determine a traffic type associated with the STA, and the beacon frame is sent in response to the traffic type requiring a throughput greater than a predetermined threshold.

12. The wireless communication device as claimed in claim 9, wherein the controller is further operable to send another beacon frame comprising an MU EDCA timer field which is set to a non-zero value and send a trigger frame to another STA via the wireless transceiver after sending the beacon frame, wherein a traffic type of the other STA requires a throughput lower than a predetermined threshold.

13. A method, executed by a wireless communication device, the method comprising:

operating as an AP to serve an STA in compliance with an IEEE 802.11 standard; and sending a beacon frame for the STA to disable an UL MU operation, wherein the beacon frame comprises an MU EDCA timer field which is set to 0 for indicating to disable the UL MU operation.

14. The method as claimed in claim 13, wherein the AP is an HE AP and the STA is a non-AP HE STA in response to the IEEE 802.11 standard being an IEEE 802.11ax standard.

15. The method as claimed in claim 13, further comprising:

determining a traffic type associated with the STA;

wherein the beacon frame is sent in response to the traffic type requiring a throughput greater than a predetermined threshold.

16. The method as claimed in claim 14, further comprising:

sending another beacon frame comprising an MU EDCA timer field which is set to a non-zero value and sending a trigger frame to another STA after sending the beacon frame;

wherein a traffic type of the other STA requires a throughput lower than a predetermined threshold.

* * * * *